Patented Oct. 1, 1929

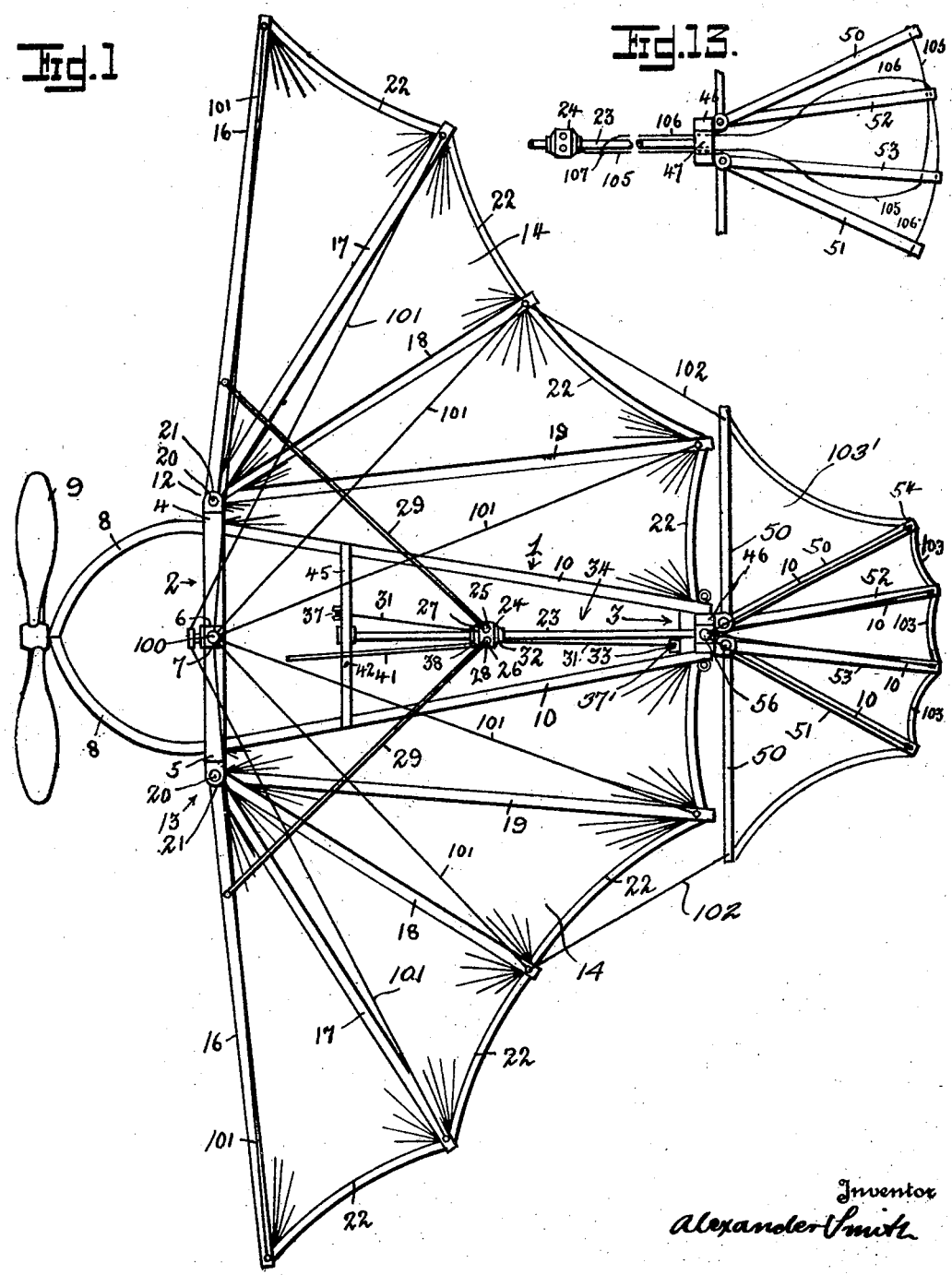

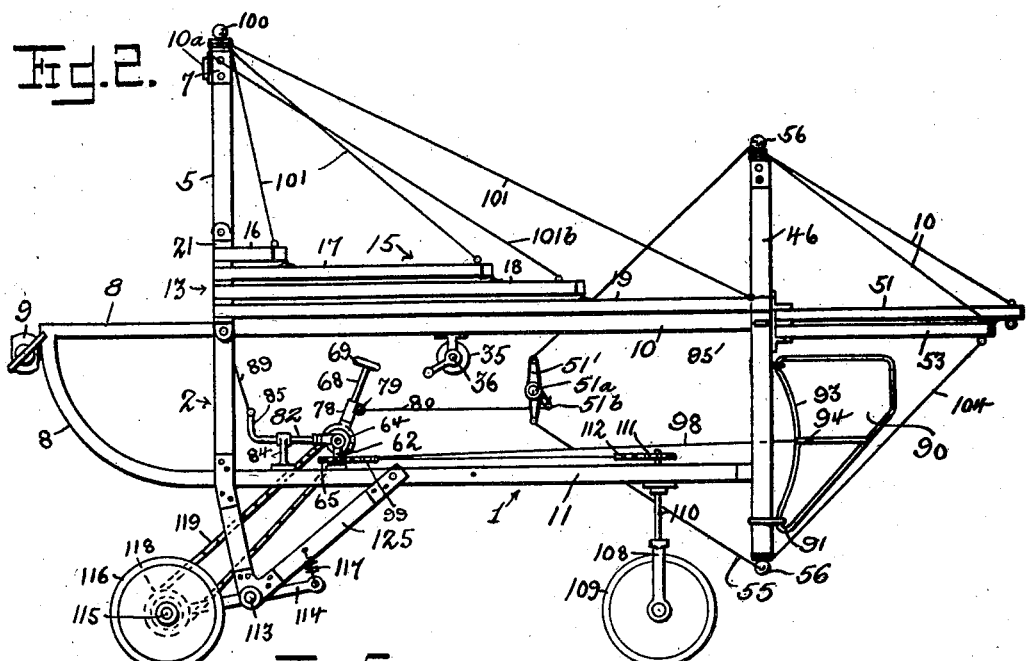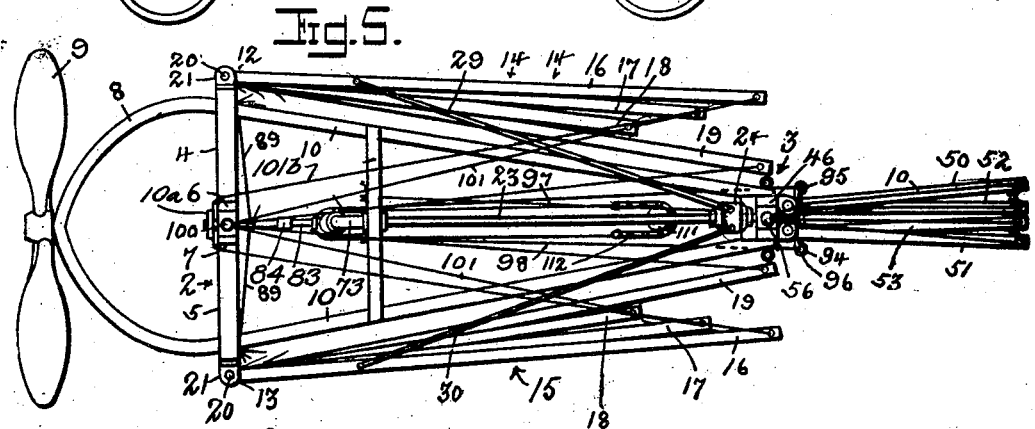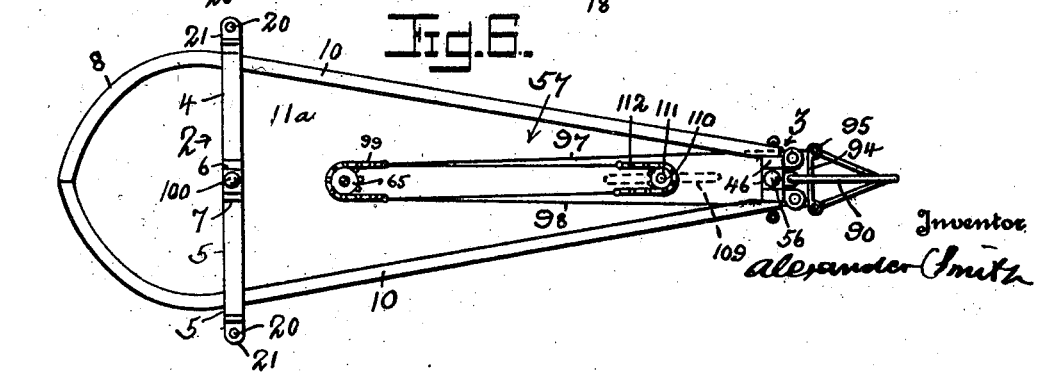

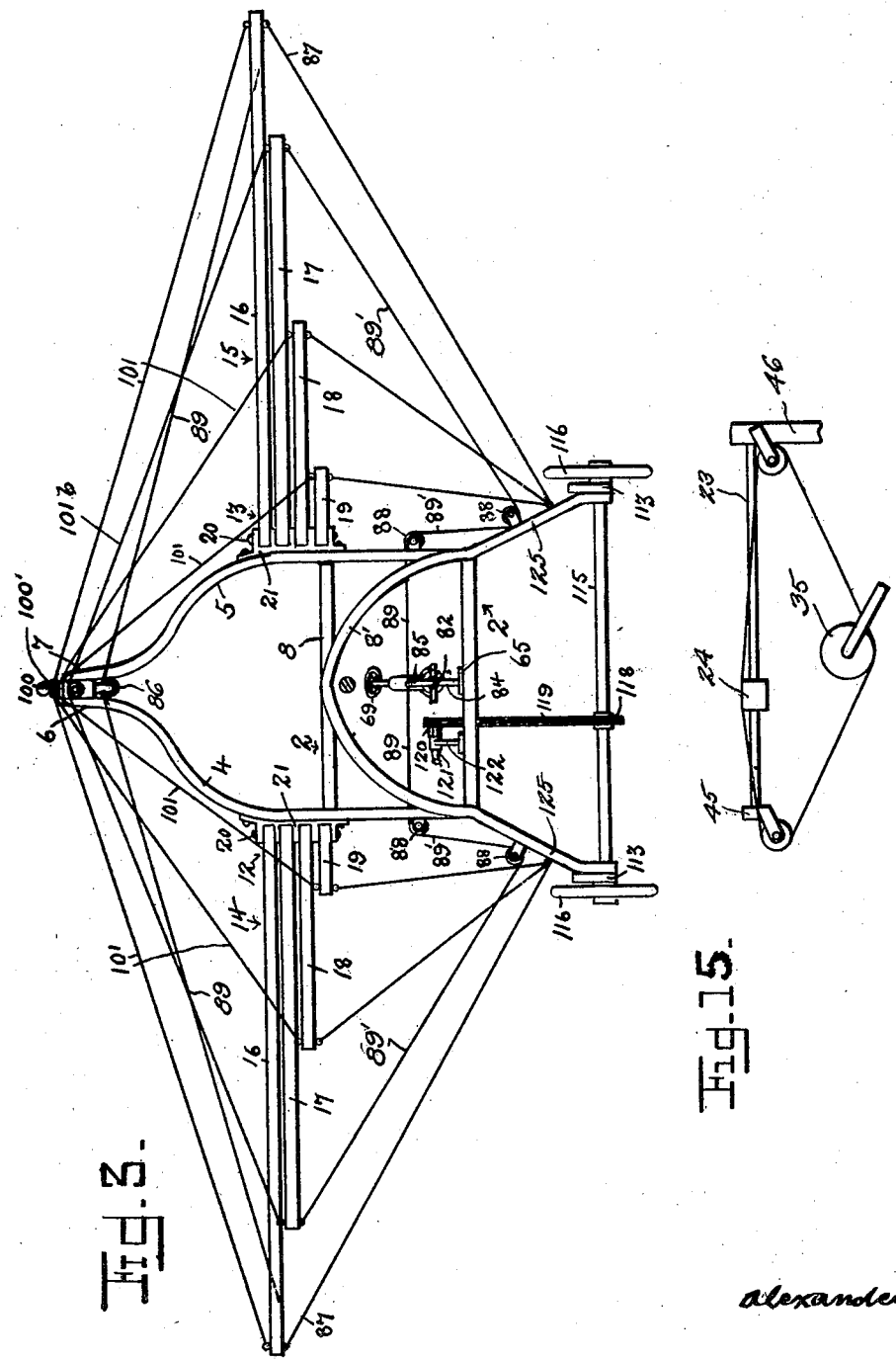

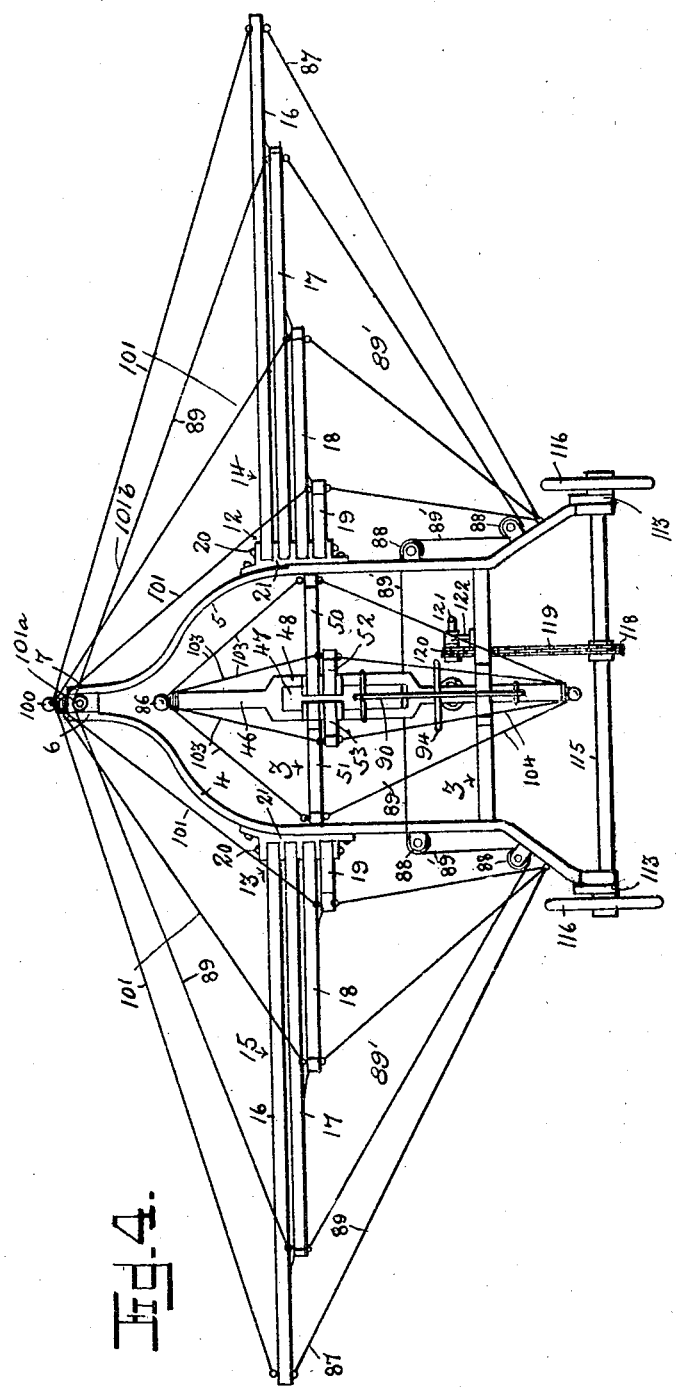

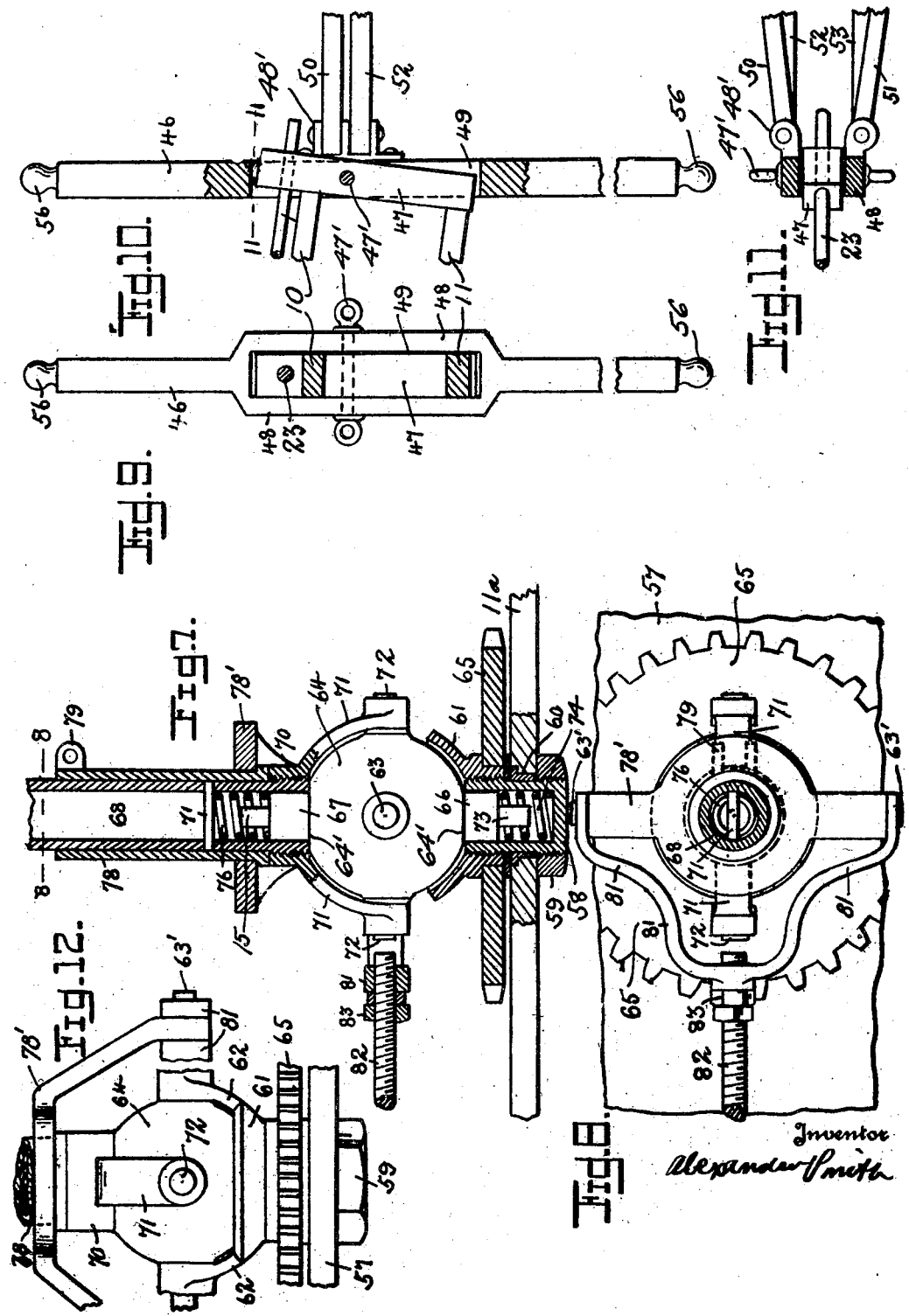

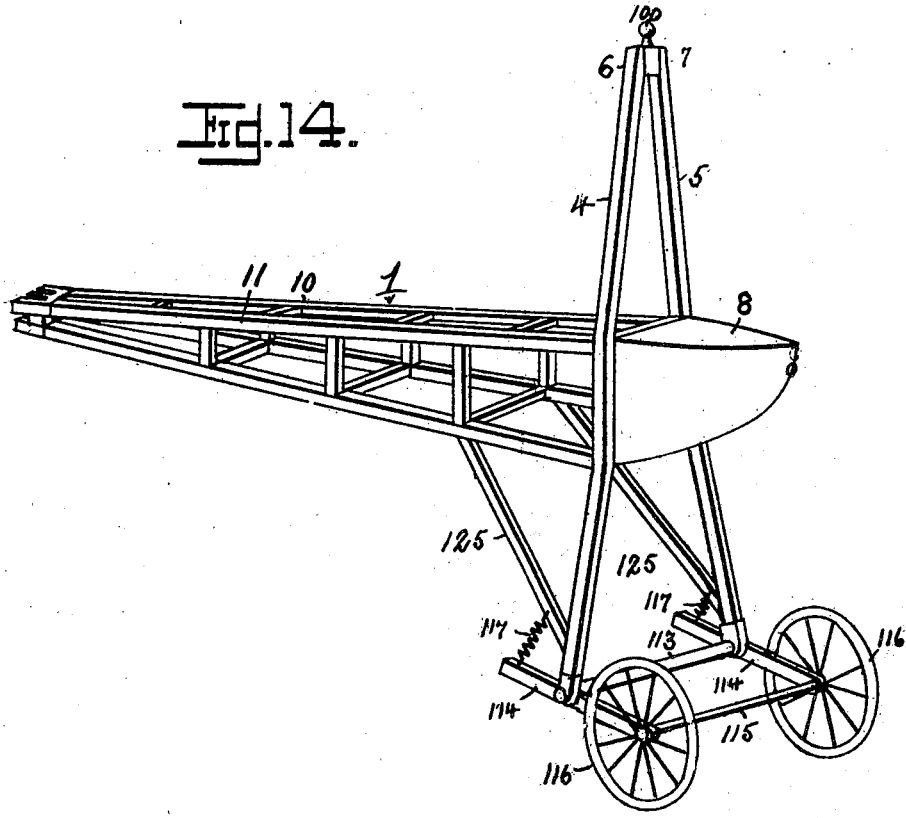

1,730,249

UNITED STATES PATENT OFFICE

ALEXANDER SMITH, OF PITTSBURGH, PENNSYLVANIA, ASSIGNOR OF ONE-HALF TO JOHN SCHMIDT, OF PITTSBURGH, PENNSYLVANIA

AIRPLANE

Application filed October 4, 1926. Serial No. 139,508.

This invention relates to improvements in aeroplanes, and has for one of its objects to provide an aeroplane, the planes of which are collapsible.

Another object of the invention is to provide an aeroplane, the main planes of which are in the form of swallows' wings.

Another object of the invention is to provide an aeroplane similar in construction to the anatomy of a swallow.

A still further object of the invention is to provide an aeroplane having foldable main and steering planes, and means whereby said planes are operated in unison.

Another object of the invention is to provide an aeroplane, all of the planes of which are foldable and may be quickly and easily collapsed for shipment, storage in hangars, or for operating the machine as a car upon the surface of the ground.

With the above and such other objects as may hereinafter more fully appear, I have invented the device illustrated in the accompanying drawings, in which—

Figure 1 is a top plan view of my aeroplane shown ready for flight.

Figure 2 is a side elevation thereof.

Figure 3 is a front elevation, and

Figure 4 is a rear elevation, with the wings extended for flight.

Figure 5 is a top plan view with the wings collapsed.

Figure 6 is a diagrammatic view illustrating the arrangement of the steering mechanism.

Figure 7 is an enlarged vertical section of the control mechanism.

Figure 8 is a transverse sectional view taken on line 8—8 of Figure 7.

Figure 9 is an enlarged front elevation of the rear portion of the device.

Figure 10 is a side elevation, partly in section, of the parts shown in Figure 9.

Figure 11 is a section on the line 11—11 of Figure 10.

Figuer 12 is a detail of portions shown in Figure 7, viewed from the opposite side, and partly in section.

Figure 13 is a diagrammatic detail.

Figure 14 is a skeleton view of the frame.

Fig. 15 is a detail of the slide and supporting rod therefor.

Like reference characters indicate like parts throughout the following specification, and in the several views in the drawings, in which—

The main frame of the invention is indicated in general by the numeral 1 and this main frame includes upper longitudinal members 10 and lower longitudinal members 11 which are spaced more widely at their forward ends than at their rear ends. At the forward ends the upper members are bowed in as at 8 to meet forwardly and the lower members are bowed in and upwardly as at 8' to meet each other and unite with the upper bowed members 8. At the forward ends of the straight portions of the members 10 and 11 are a pair of upright members 4 and 5 which are parallel between the upper and lower longitudinal frame members and are then bowed in to lie close together as at 6 and 7 and are secured to a bearing block and swivel pin 100 at their upper ends. Secured to the lower members 11 and the members 4 and 5 are brackets 125 which support levers 114 which are pivoted intermediate their ends and have their rear ends connected to the brackets by springs 117 so that the front ends are urged downwardly. The front ends of these levers carry the axle 115 whereon is mounted the ground wheels 116. On this axle is the sprocket 118 which is driven by a chain 119 leading to a sprocket 120 carried on a shaft 121 supported in a bearing 122, the shaft being driven from an engine (not shown). In this manner the front end of the machine is supported. Between the members 11 there is a suitable floor or deck 11ª and through this deck extends a shaft 110 carrying on its lower end a fork 108 wherein the steering wheel 109 is mounted. At the top of the shaft 110 is a sprocket 111 around which extends a chain 112 for operating the shaft 110 and thus controlling the direction in which the aeroplane is steered when on the ground.

The usual propelling means is indicated at 9 and is, of course, connected to a suitable engine (not shown) as the same forms no part of the present invention. On the outer side of each of the members 4 and 5 is secured a bracket 21 carrying a pivot pin 20 and on each of these pivot pins is arranged a series of wings ribs 16, 17, 18 and 19, the ribs being graduated in length from 16 down. On the pin 100 is a swivel ring 100' and guy wires 101 connect this ring with the ends of the ribs 16, 18 and 19, the rib 17 on each side being free from upper support at its ends. Similarly, the ribs 16, 18 and 19 are connected to the brackets 125 by guy wires 89, the ribs 17 being left unsupported from below at their ends.

The rear ends of the members 10 and 11 are connected to a strut or upright 47 at the top and bottom thereof and a cross brace 45 connects the upper members 10. Between the cross brace 45 and the strut 47 extends a guide bar or rod 23 on which is mounted a slide 24. Braces 29 and 30 connect the slide 24 with the long ribs 16 in spaced relation to the pivot points of said ribs. Beneath the members 10 there is provided a suitable winding drum 35 having a crank 36 and around this winding drum is wound a cable 31 which leads forwardly around a pulley 37 and back to the slide 24 to which it is attached. The other end of the cable leads rearwardly around a pulley 37' and forwardly to the slide 24, being likewise attached thereto. Wing fabric 14 is attached to the ribs and to the upper members 10, the wing thus formed being supplied with a reinforced edge 22 which limits the spreading of the wings.

Under these circumstances rotation of the drum in one direction will draw the slide 24 forward and spread the wings while rotation in the opposite direction collapses or furls the wings.

Secured in the forward part of the floor 11ª is a bearing 60 wherein is journaled a hollow shaft 58 having a nut 59 on the lower end. On the upper end of this shaft 58 is fixed a ball socket 61 whereon is mounted a sprocket 65 around which the chain 112 extends. Extending from opposite portions of the socket 61 are bearing arms 62 and between these arms is located a ball 64 having upper and lower flat portions 64'. Projecting diametrically from the ball 64 are journals 63 which fit in the bearing arms 62. At right angles to the journals 63 the ball is provided with journals 72 whereon fits a yoke 71 terminating in a collar 70 in which is screwed the lower end of a steering or control post 68 having a steering wheel 69 at its upper end. This steering post is hollow and in the lower end of this post is fitted a plunger 67 having a flat end resting on the flat surface 64' at the upper side of the ball in normal conditions. This plunger is urged against the ball by a spring 76. Similarly, in the hollow shaft 58 there is a corresponding plunger 66 urged upwardly by a spring 74. Thus by means of these plungers when the steering shaft is perpendicular it is held in that position but the shaft may be rocked on the journals 72 of the ball in one plane and the ball itself with the shaft may be rocked on the journals 63 in another plane, the springs 74 and 76 yielding to permit this movement. Furthermore, rotation of the shaft will rotate the ball and consequently the sprocket 65 so that steering of the device on the ground may be accomplished. Mounted on the hollow shaft 68 is a rotatable sleeve 78 the lower end of which rests against the collar 70. On this sleeve is mounted a yoke 78' having depending arms carrying journals 63'. On these journals 63' is also fitted a yoke 81 to which is connected a rock shaft 82 which passes through a bearing 84 and has an upturned end 85. Leading from this rock arm 85 is a pair of cables 89 which extend in opposite directions around idler pulleys 88 and pass outwardly and upwardly to the ends of the unsupported wing ribs 17 where they are attached. At the top of the front frame is a pulley 101ª and a cable 101ᵇ passes over this pulley and has its ends connected to the outer ends of the ribs 17. Thus as the shaft 82 is rocked by manipulation of the steering wheel both of the wings are warped at the ribs 17, these ribs being flexible to permit this action.

Through the strut 47 extends a pivot pin 47' and on this pivot pin is mounted a lever 46 having a central slotted portion 48 which embraces the strut 47. Fixed to the rear side of the portion 28 at each side of the strut 47 is a bracket 48'. In these brackets are pivoted the tail ribs 51, 52, 53 and 54 carrying the tail fabric 103' having the selvage edge 103 reinforced to limit spreading of the tail. Guy wires 102 connect the outer ribs of the tail with the ribs 18 of the wings so that as the wings are expanded the tail is expanded. The central part of the tail is tensioned in its expanded position by means of tension wires 105 and 106 which are connected to the slide 24 and extend rearwardly to pass through the inner ribs of each side of the tail to the opposite side of the tail and to be there connected to the central tail rib. Knobs 56 are carried at the top and bottom of the lever 46 and from each of these knobs extends a wire 55 which is connected to the arms of a double arm crank 51' fixed on a shaft 51ª also having a third arm 51ᵇ connected by a link 80 with an eye 79 formed on a sleeve 78 mounted on the steering shaft 68. Thus by moving the steering shaft forward the tail is tilted downwardly while by pulling the steering shaft backward the tail is tilted upwardly. Also on the lever 46 is mounted a rudder 90 which is connected by wires 98 with the chain 112 so that movement of the wheel 109 is accomplished by movement of the rudder 90.

It will now be seen that the steering wheel and its shaft controls flexure of the wings at about their middle points and also the vertical position of the tail as well as controlling the rudder.

Having described my invention, that which I claim as new, and desire to protect by Letters Patent, is:

1. In an aeroplane, a fuselage, lateral wings foldable toward the fuselage, a post member mounted to swing, connecting means between said post and wings and operative to control the vertical position of the wings.

2. In an aeroplane, a fuselage, laterally directed wings movably coupled to the fuselage, a post member mounted to swing, a shaft coupled to said post and adapted to be oscillated thereby, and connecting means carried by said shaft to control the vertical position of the wings.

3. In an aeroplane, a fuselage, laterally directed wings movably coupled to the fuselage, a post member mounted to swing, a shaft coupled to said post and adapted to be oscillated thereby, connecting means carried by said shaft to control the vertical position of the wings, a steering device, and connecting means between the post and the steering device to control the position thereof.

4. In an aeroplane, a fuselage, laterally directed wings movably coupled to the fuselage, a post member mounted to swing, a shaft coupled to said post and adapted to be oscillated thereby, connecting means carried by said shaft to control the vertical position of the wings, a steering device, a ground wheel connected to the fuselage, connecting means between the post and steering device, and connecting means between the post and the ground wheel and operative to control the position of the same.

5. In an aeroplane, a fuselage, lateral wings connected to the fuselage, a tubular stub shaft supported by the fuselage and having spaced arms, a coupling member rotatively supported relative to the stub shaft and pivoted to said arms, a sleeve member having spaced arms pivotally connected to said coupling member, a yoke device pivoted relative to said coupling member, a shaft connected to said yoke device, connecting means between said shaft and the wings and operative to control the vertical position of the same, and means for rotating said sleeve and the parts associated therewith.

6. In an aeroplane, a fuselage, a series of wing ribs pivoted to each side of the forward part of the fuselage on a common pivot, wing fabric supported on the ribs to form folding wings, means to flex the central outer portion of each wing, means to support the remainder of the wings against flexure, a tilting tail structure pivoted at the rear of said fuselage and including a rudder, and a single controlling device for actuating the wing flexing means, the rudder, and tilting of the tail.

7. A steering unit for controlling the wings and lateral and vertical rudders of an airplane and comprising a shaft section journaled to revolve in a fixed position and carrying one member of a universal joint, a steering post fixed to the second member of a universal joint, said universal joint members being connected together, a lateral rudder steering mechanism including a member fixed to the first shaft section, a vertical rudder steering mechanism connected to the steering post above the universal joint and operable by tilting of the post in fore and aft directions, a yoke mounted to revolve on the steering post and having arms provided with journals axially alined with the center of the universal joint, a second yoke having arms pivoted on said journals, a rock shaft fixed to the center of the second yoke, and a rock arm on said rock shaft having operative connection with movable portions of the airplane wings.

ALEXANDER SMITH.